(12) United States Patent
Vido

(10) Patent No.: US 7,838,445 B2
(45) Date of Patent: Nov. 23, 2010

(54) MULTI-LAYER WRAPPING MATERIAL WITH WATER VAPOR-PERMEABLE INNER LAYER

(75) Inventor: Martin Vido, Mission (CA)

(73) Assignees: Interwrap Inc., British Columbia (CA); IBCO SRL, St. Michael (BB)

( * ) Notice: Subject to any disclaimer, the term of this patent is extended or adjusted under 35 U.S.C. 154(b) by 587 days.

(21) Appl. No.: 11/125,787

(22) Filed: May 10, 2005

(65) Prior Publication Data

US 2006/0258240 A1    Nov. 16, 2006

(51) Int. Cl.
B32B 29/02    (2006.01)
B32B 27/32    (2006.01)
B32B 27/04    (2006.01)

(52) U.S. Cl. .............................. 442/2; 442/33; 442/35; 442/38; 442/41; 442/43; 442/46; 442/49; 442/123; 442/124

(58) Field of Classification Search ................ 442/236, 442/237, 35, 38, 41, 43, 45, 46, 49, 123, 442/124, 2, 33; 428/198, 594
See application file for complete search history.

(56) References Cited

U.S. PATENT DOCUMENTS

| | | | |
|---|---|---|---|
| 4,321,297 A * | 3/1982 | Adelman | ................. 428/292.7 |
| 4,950,523 A | 8/1990 | Raszewski | |
| 5,028,479 A | 7/1991 | Pinchuk et al. | |
| 5,281,471 A | 1/1994 | Diete et al. | |
| 5,500,303 A | 3/1996 | Anderson | |
| 5,712,008 A | 1/1998 | Todt | |
| 5,736,231 A | 4/1998 | Todt | |
| 5,863,642 A * | 1/1999 | Henderson et al. | ........... 428/218 |
| 5,958,805 A * | 9/1999 | Quinones | .................... 442/236 |
| 6,132,827 A | 10/2000 | Miro | |
| 6,224,957 B1 | 5/2001 | Crook et al. | |
| 6,242,371 B1 | 6/2001 | Quinones | |
| 6,439,384 B2 | 8/2002 | Martin | |
| 6,444,595 B1 | 9/2002 | Elkouh et al. | |
| 6,586,080 B1 | 7/2003 | Heifetz | |
| 6,773,774 B1 * | 8/2004 | Crook et al. | ................ 428/34.7 |
| 6,794,317 B2 | 9/2004 | Ekkouh et al. | |

FOREIGN PATENT DOCUMENTS

| | | |
|---|---|---|
| DE | 39 38 125 A1 | 5/1991 |
| JP | 2003063591 A2 | 3/2003 |
| WO | WO 03/028999 A1 | 4/2003 |
| WO | WO 03/103957 A1 | 12/2003 |

* cited by examiner

*Primary Examiner*—Ula C Ruddock
(74) *Attorney, Agent, or Firm*—Kirton & McConkie; Evan R. Witt

(57) ABSTRACT

A multi-layered sheet material for wrapping metal goods to protect them from corrosion during storage has a water impermeable and water vapor-impermeable outer layer comprising a coated woven scrim and a water-impermeable and water vapor permeable inner layer comprising a micro-perforated film. The inner layer incorporates corrosion inhibitors. The outer and inner layers are bonded along their longitudinal edges leaving a space between the layers into which water vapor can migrate away from the wrapped metal product.

18 Claims, 1 Drawing Sheet

MULTI-LAYER WRAPPING MATERIAL WITH WATER VAPOR-PERMEABLE INNER LAYER

FIELD OF THE INVENTION

The present invention is directed to wrapping materials for use in packaging metal goods. More particularly, it is directed to a multi-layer sheet material that reduces corrosion of the wrapped metal goods during handling, transportation and storage.

BACKGROUND OF THE INVENTION

Most metals are susceptible to corrosion from ambient or atmospheric conditions. The metal packaging industry has successfully developed various methods and compounds for reducing corrosion of metals during storage and use. However, the effectiveness of metal wrapping materials still requires improvement.

In International patent publication No. WO 03/103957 A1 dated Dec. 18, 2003 (Shokar et al.) a sheet material is disclosed having an outer woven scrim layer and an inner film layer that is impermeable to air and water and incorporates corrosion inhibitors. The two layers are bonded along their edges, permitting each layer to move independently of the other, by sliding. It would be desirable, however, to provide a sheet wrapping material which permits water vapor or condensed water that is in contact with the wrapped metal item to migrate away from it.

SUMMARY OF THE INVENTION

The invention provides a sheet material for packaging metal items, for example metal coils, so as to protect them from corrosion. It has a first layer, intended to be the outer layer during use, comprising a coated woven scrim that is water-impermeable and water vapor-impermeable. It has a second layer, intended to be the inner layer during use, that is water-impermeable and water vapor-permeable and incorporates a corrosion inhibitor. The outer and inner layers are bonded together along two opposed edges, and optionally at other points, permitting the layers to slide relative to each other and providing a space between the layers into which water vapor can migrate away from the surface of the wrapped metal item.

The water vapor-permeability of the inner layer may be achieved by various means. In the preferred embodiment, the inner layer is microperforated. In other embodiments, the inner layer comprises a thermoplastic elastomer or polyurethane that is water vapor-permeable without perforations, for example a water vapor-breathable film. In yet other embodiments, the inner layer is a biaxially-oriented calcium carbonate film having small holes around the calcium particles.

It will be understood that in describing a layer herein as "impermeable," it is meant that it is sufficiently impermeable for practical purposes as a wrapping material.

The polymer materials used for the first and second layers of the sheet material are preferably polyolefins, such as polyethylene or polypropylene, but they may be any ones that can be used in the field of industrial packaging, including polyesters, polyamides, PET and TPE.

In a further embodiment of the invention, a layer of water-absorbent material, for example a sheet of kraft paper, is bonded to the inner side of the outer layer. The paper layer may incorporate a volatile corrosion inhibitor.

DETAILED DESCRIPTION

Figure 1:
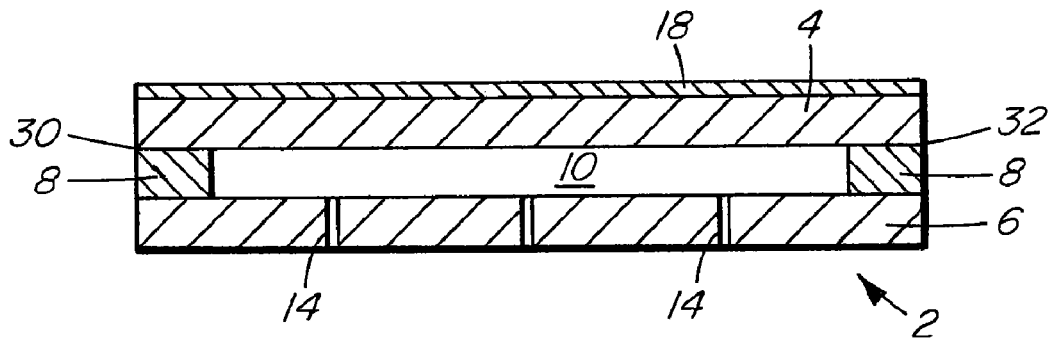
FIG. 1 is a cross-sectional view through the sheet material according to the first embodiment of the invention.
Figure 2:
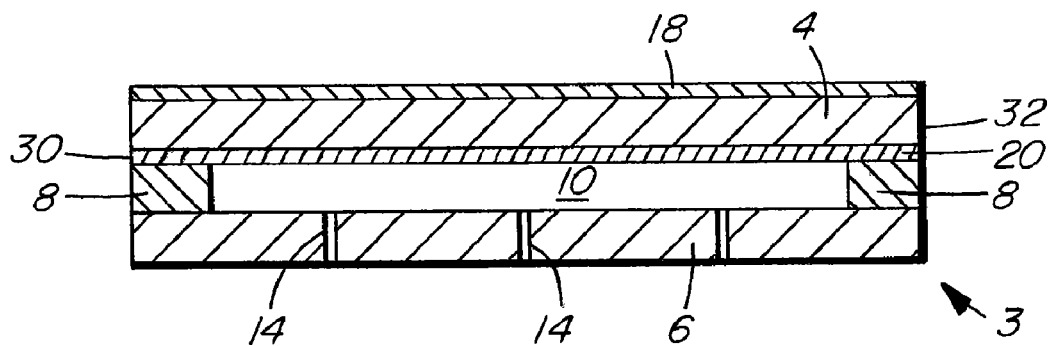
FIG. 2 is a cross-sectional view through the sheet material according to the second embodiment of the invention.
Figure 3:
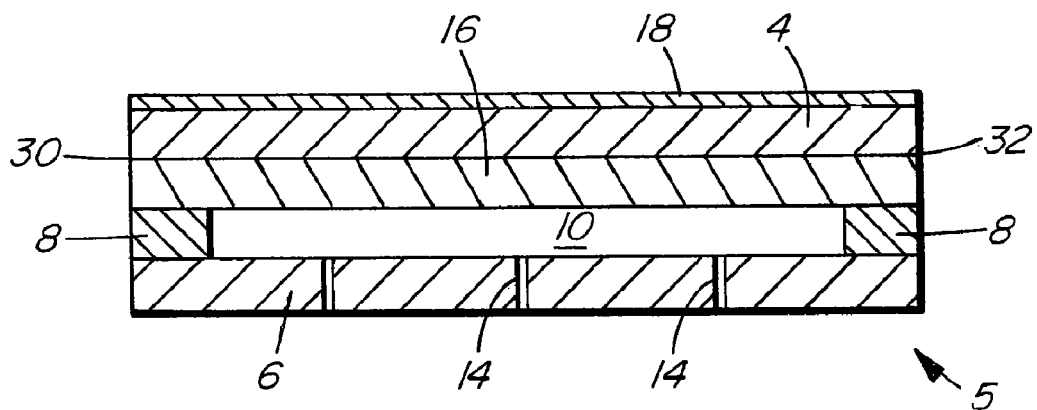
FIG. 3 is a cross-sectional view through the sheet material according to the third embodiment of the invention.

FIGS. 1 to 3 show preferred embodiments of the sheet material. In these drawings, the same or similar elements in the various embodiments are indicated by like reference numbers. The Figures are not to scale and exaggerate the thickness of the various layers for clarity of illustration.

FIG. 1 shows a first embodiment of the invention. Sheet material 2 comprises a coated scrim 4 and a polyolefin film 6 bonded along opposite edges 30, 32 by strips of adhesive 8. In use for wrapping metal goods, the film 6 is the inner layer, i.e. the layer that contacts the wrapped metal goods, and the coated scrim 4 is the outer layer.

Since layers 4 and 6 are bonded together only at two opposed edges, preferably the edges parallel to the machine direction, and optionally at other points, but in any event not continuously across their surfaces, there is a space 10 between the two layers. It will be understood that, in use, the layers will touch at many points and the thickness of the space 10 at any point, i.e. the distance between layers 4 and 6, will vary and depend largely on the manner in which the sheet material 2 is applied to a particular item.

The sheet material of the invention is produced by feeding the layers off rolls and through conventional fabricating equipment, including rollers or laminators. The direction along the length of the material as processed through the production equipment is referred to herein as the "machine direction." The direction perpendicular to the machine direction is referred to herein as the "cross direction," being the direction along the width of the sheet material between edges 30 and 32.

The scrim 4 is a woven structure made of polyolefin tapes which are fabricated by methods well known in the art. The tapes are preferably about 1.5 to 6 mm in width. The number of tapes in the machine direction is preferably in the range of 4 to 16 tapes per inch. The number of tapes in the cross direction is preferably in the range of 2 to 16 tapes per inch. The decitex of the tapes (grams per 10,000 meters) is preferably in the range of 500-2,500. The weight of the scrim is preferably in the range of 30 to 400 grams per square meter. The width of the scrim 4, and of the sheet material 2, can be any convenient width that can be processed on available production equipment and is suitable for a particular application. It is preferably in the range of 30 to 160 inches.

Scrim 4 has high mechanical and tensile strength in both the machine and cross directions. During production of the tapes, they are typically stretched from three to five times their original length by passing through hot pinch rolls to align polymer chains within the body of the tapes to increase their strength. It is a function of the scrim to impart mechanical strength to sheet material 2.

The scrim 4 may be fabricated of any suitable polyolefin, including high density polyethylene, low density polyethylene and polypropylene.

Film 18 is laminated to the outer side of scrim 4. The film 18 is a coating of polyolefin applied to the scrim to render it impermeable to the transmission of water and water vapor, and substantially impermeable to the transmission of air. The coated scrim is accordingly water-impermeable and water vapor-impermeable, to protect the wrapped metal item. The coated scrim 4 may have a small degree of permeability to oxygen to permit a small amount of air to pass through the sheet material.

Layer 6 comprises a film that is water-impermeable and water vapor-permeable. The feature of water-impermeability provides protection additional to that provided by the outer layer 4, 18 against water penetration to the wrapped metal object. The feature of water vapor permeability provides means for water vapor that is proximate the wrapped metal object to move away from it, as discussed below.

Preferably, layer 6 is a micro-perforated, woven polyolefin wrap with a polyolefin coating on one side thereof. It may also be a microperforated non-woven polyolefin film.

Micro-perforation of sheet material to render it water vapor-permeable while remaining water-impermeable (i.e. impermeable to liquid water) is well-known in the art of manufacturing wrapping materials, and is a process commonly used in the manufacture of housewrap sheeting material. Layer 6 has a plurality of micro-perforations 14. Preferably, the water vapor-permanence of layer 6 is in the range of 170 to 1400 nanograms/Pa-s-m$^2$. The function of micro-perforations 14 is to allow any condensation that may be present on the surface of the wrapped metal object, or between the layer 6 and the metal surface, to move away from the metal surface through the micro-perforations in vapor form, where it can condense on the inner surface of the outer layer 4, in space 10, where it is out of direct contact with the metal surface.

Various combinations of microperforation hole size and spacing can be selected by a person skilled in the art to give the desired degree of water vapor-permeability. An example of a suitable microperforated layer has perforations spaced about 6 mm apart and with a hole diameter of about 0.25 mm. Preferably, the diameter of the microperforations 14 is in the range of 0.005 mm to 0.35 mm.

Layer 6 is preferably made of polyolefin, e.g. polyethylene or polypropylene, with a thickness in the range of about 0.03 to 2 mm, more preferably about 0.1 mm.

Layer 6 incorporates a corrosion inhibitor to help prevent corrosion of the wrapped metal object. Preferably, it incorporates both a volatile corrosion inhibitor and a contact corrosion inhibitor. If desired, it can incorporate either one of these types of corrosion inhibitors rather than both. Preferably, the volatile corrosion inhibitor is present in concentrations of 0.1 to 5 percent by weight (i.e. relative to the weight of the inner layer). Preferably, the contact corrosion inhibitor is present in concentrations of 0.5 to 15 percent by weight. The volatile and contact corrosion inhibitors can be selected from ones well known in the art. For example, the volatile corrosion inhibitor can be a nitrite compound such as dicyclohexylammonium nitrite; the contact corrosion inhibitor can be potassium pyrophosphate or an alkali metal nitrite or benzoate, such as sodium nitrite or sodium benzoate. Any of a wide variety of volatile and contact corrosion inhibitors known in the art, and mixtures thereof, can be selected for use in the invention. In use, the volatile corrosion inhibitors are transferred to the metal surface by volatilizing from the solid phase and inhibit corrosion by forming a protective layer around the metal surface. The contact corrosion inhibitors protect by creeping from the film to the metal surface. The sheet material is preferably able to supply corrosion inhibitors to the metal item for a period of up to two years, effectively inhibiting corrosion.

The corrosion inhibitors are incorporated into the resin used to make the film layer 6 by methods well known in the art. Typically, the compositions are compounded with a carrier resin in a master batch, which is then mixed and diluted with the base resin used to make the film.

The coated scrim 4, being substantially impermeable to gases, forms a barrier that holds any volatile corrosion inhibitor, released from the film 6 into the space 10 between layers 4 and 6, from escaping into the atmosphere. Such volatile corrosion inhibitor can pass through micro-perforations 14 and into contact with the wrapped metal object.

The coated scrim 4 is bonded to the film 6 by strips of adhesive 8 along edges 30 and 32, i.e. along the edges in the machine direction. The strips of adhesive are narrow relative to the total width of the sheet material. They are preferably in the range of 0.5-3 inches wide. The strips 8 can be continuous or intermittent. The layers may alternatively be bonded by means of melt bonding or sonic bonding, or other suitable means. The two layers of the sheet material are accordingly unattached except at their edges 30 and 32, and are free to slide relative to one another across their middle part and thereby work independently of each other in protecting the wrapped item. Optionally, additional strips or spots of glue to bond layers 6 and 4 together may be provided, for example to increase the mechanical stability of the sheet material 2 if its width is large. In any event, the adhesion of layer 6 and 4 is not continuous across their surfaces. Not being laminated to the scrim, the inner layer is more free to cling to the wrapped metal item. The natural tendency of a polyolefin film to hold a static charge promotes static cling of the film to the metal item. The close contact of the film 6 and the wrapped item is conducive to transfer of contact corrosion inhibitor to the metal item.

Referring next to FIG. 2, which illustrates a second embodiment of the invention, the sheet material 3 differs from sheet material 2 in having a film 20 laminated to the inner side of scrim 4. The film 20 is a coating of polyolefin applied to the scrim to impart additional protection against the transmission of air and water into contact with the wrapped item. The film 20 is preferably from 0.5 to 3 mils in thickness and has a weight of 12 to 72 grams per square meter. The polyolefin of film 20 may be any suitable polyolefin, including high and low density polyethylene and polypropylene. It can be the same as or different from the polyolefin of scrim 4 and of film 18.

A third embodiment of the invention is shown in FIG. 3. Sheet material 5 differs from sheet material 2 in that it includes a layer of kraft paper 16 laminated to the inner side of scrim 4. The kraft paper 16 preferably has a weight in the range of 200 grams per square meter. It imparts moisture-absorbency to the sheet material, whereby water vapor that passes into the space 10 through the micro-perforations 14 and condenses to liquid water, is absorbed into the paper layer 16.

In the third embodiment, either paper layer 16, or layer 6, incorporates a corrosion inhibitor and, preferably, both layers incorporate it. Where the paper layer 16 incorporates a volatile corrosion inhibitor, such volatile corrosion inhibitor can pass through layer 6 by its micro-perforations 14 and into contact with the wrapped metal item.

Although the invention has been described in terms of specific embodiments, it is not intended that the invention be limited to these embodiments. Various modifications within the scope of the invention will be apparent to those skilled in the art. For example, instead of a layer of kraft paper, a layer of non-woven fibers can be used. The inner layer may be made water-impermeable and water vapor-permeable by means other than micro-perforation. One or more layers may include pigments or other additives, such as flame retardants and UV-resistant compositions, making the product more suitable for particular applications. The outer surface may be treated with an anti-skid coating. The scope of the invention is defined by the claims that follow.

What is claimed is:

1. A sheet material for wrapping metal goods, comprising:
   (a) a first layer comprising a coated woven scrim, said coated scrim being water-impermeable and water vapor-impermeable;
   (b) a second layer that is water-impermeable and water vapor-permeable and incorporates a corrosion inhibitor, said second layer being attached to said first layer at narrow, spaced-apart strips along two opposed edges of said first and second layers, said second layer having a water vapor permeance in the range of 170 to 1,400 ng/Pa per second per square meter.

2. A sheet material according to claim 1, wherein said first layer further comprises a sheet of water-absorbent material bonded to an inner side of said coated scrim.

3. A sheet material according to claim 2, wherein said absorbent material is kraft paper.

4. A sheet material according to claim 1 wherein said scrim comprises polyolefin tapes.

5. A sheet material according to claim 4 wherein said polyolefin is polyethylene or polypropylene.

6. A sheet material according to claim 1 wherein said scrim is coated on one or both sides thereof with a polyolefin film.

7. A sheet material according to claim 1 wherein said first layer is attached to said second layer at narrow strips by means of an adhesive.

8. A sheet material according to claim 1 wherein said second layer is woven.

9. A sheet material according to claim 1 wherein said second layer is non-woven.

10. A sheet material according to claim 1 wherein said second layer has a thickness in the range of 0.3 to 2 mm.

11. A sheet material according to claim 1 wherein said corrosion inhibitor in said second layer comprises 0.5 to 5 percent by weight of said second layer.

12. A sheet material for wrapping metal goods, comprising:
   (a) a first layer comprising a coated woven scrim, said coated scrim being water-impermeable and water vapor-impermeable;
   (b) a second layer that is water-impermeable and water vapor-permeable and incorporates a corrosion inhibitor, said second layer being attached to said first layer at narrow, spaced-apart strips along two opposed edges of said first and second layers, wherein said second layer is microperforated.

13. A sheet material according to claim 12 wherein said microperforations have a diameter in the range of 0.005 mm to 0.35 mm.

14. A sheet material for wrapping metal goods, comprising:
   (a) a first layer comprising a coated woven scrim, said coated scrim being water-impermeable and water vapor-impermeable;
   (b) a second layer comprising a film, said film being water-impermeable and water vapor-permeable, said second layer having a water vapor permeance in the range of 170 to 1,400 ng/Pa per second per square meter;
   (c) a third layer comprising kraft paper bonded to a side of said first layer, said third layer being attached to said second layer at narrow, spaced-apart strips along two opposed edges of said third and second layers;
   (d) a corrosion inhibitor incorporated in at least one of said second and third layers.

15. A sheet material according to claim 14 wherein said corrosion inhibitor is incorporated in said second layer and includes a contact corrosion inhibitor.

16. A sheet material according to claim 14 wherein said corrosion inhibitor is incorporated in said third layer and includes a volatile corrosion inhibitor.

17. A sheet material according to claim 14 wherein said third layer is attached to said second layer at narrow strips by means of an adhesive.

18. A sheet material for wrapping metal goods, comprising:
   (a) a first layer comprising a coated woven scrim, said coated scrim being water-impermeable and water vapor-impermeable;
   (b) a second layer comprising a film, said film being water-impermeable and water vapor-permeable, said second layer being microperforated;
   (c) a third layer comprising kraft paper bonded to a side of said first layer, said third layer being attached to said second layer at narrow, spaced-apart strips along two opposed edges of said third and second layers;
   (d) a corrosion inhibitor incorporated in at least one of said second and third layers.

* * * * *